(12) United States Patent
Taniguchi

(10) Patent No.: US 7,126,706 B2
(45) Date of Patent: Oct. 24, 2006

(54) DATA TRANSMISSION SYSTEM FOR PRINTING DATA AT A SITE REMOTE FROM A HOME LOCATION/OFFICE

(75) Inventor: Katsuya Taniguchi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 940 days.

(21) Appl. No.: 09/859,089

(22) Filed: May 16, 2001

(65) Prior Publication Data

US 2001/0046067 A1 Nov. 29, 2001

(30) Foreign Application Priority Data

May 18, 2000 (JP) ............... 2000-146865

(51) Int. Cl.
*G06F 15/00* (2006.01)
(52) U.S. Cl. ...................... 358/1.15; 358/1.5
(58) Field of Classification Search ............. 358/1.1, 358/1.9, 1.13, 1.15, 501, 401, 1.5
See application file for complete search history.

(56) References Cited

U.S. PATENT DOCUMENTS

| | | | | |
|---|---|---|---|---|
| 5,935,217 A | * | 8/1999 | Sakai et al. | 709/249 |
| 6,493,757 B1 | * | 12/2002 | Sakai et al. | 709/226 |
| 6,549,654 B1 | * | 4/2003 | Kumada | 382/162 |

FOREIGN PATENT DOCUMENTS

| JP | 07-152510 | 6/1995 |
|---|---|---|
| JP | 8-307580 | 11/1996 |
| JP | 09-018933 | 1/1997 |
| JP | 10-063601 | 3/1998 |
| JP | 10-191453 A | 7/1998 |
| JP | 10-198532 | 7/1998 |
| JP | 10-222527 | 8/1998 |
| JP | 2000-078660 | 3/2000 |

OTHER PUBLICATIONS

Please see Japanese Patent Office Action and translation.
Please see English translation of Japanese Patent Office Action.

* cited by examiner

*Primary Examiner*—Gabriel I. Garcia
(74) *Attorney, Agent, or Firm*—David G. Conlin; William J. Daley, Jr.; Edwards Angell Palmer & Dodge LLP

(57) ABSTRACT

The system of the invention includes: a storage portion for storing the information as to installation sites of a plurality of output apparatuses and their functional information (e.g., shop list table in the print service server); and an output apparatus candidate selecting device for extracting the candidates for the nearby output apparatus capable of producing an output of the image data, with reference to the information as to installation sites of the output apparatuses with their functional information stored in the storage portion, based on the image data input via the network from a portable terminal device and the information as to the current position of the portable terminal device. The image data is transferred to the output apparatus selected by the user from the output apparatus candidates presented by the output apparatus candidate selecting device.

28 Claims, 6 Drawing Sheets

FIG. 2

| Shop name | IP address | Printer name | Color/monochrome | Paper size | File format |
|---|---|---|---|---|---|
| Branch No. 1 in Tokyo | xxx.xxx.xxx.xxx | Type AAA FX Corp. | Color/monochrome | A3 | PS · PDF |
| Shinagawa Shop | xxx.xxx.xxx.yyy | Type BBB C Corp. | Color/monochrome | A4 | PS |
| Shibuya Shop | xxx.xxx.xxx.zzz | Type CCC R Corp. | monochrome | A3 | PDF · TIFF |
| Shinjuku Shop | xxx.xxx.xxx.aaa | Type DDD S Corp. | monochrome | A3 | PDF · TIFF |
| Yokohama Shop | xxx.xxx.xxx.bbb | Type AAA FX Corp. | Color/monochrome | A3 | PS · PDF |
| Kawasaki Shop | xxx.xxx.xxx.ccc | Type BBB C Corp. | Color/monochrome | A4 | PS |
| Yokosuka Shop | xxx.xxx.xxx.ddd | Type CCC R Corp. | monochrome | A3 | PDF · TIFF |

FIG. 3

```
Your print job can be accepted
at the following shops.

☐ Tokyo branch No.1     Color

☐ Shibuya Shop     Monochrome
```

|  | Distance 0 | Distance 1 | Distance 2 | Distance 3 |
|---|---|---|---|---|
| ... ... ... | ... ... ... | ... ... ... | ... ... ... | ... ... ... |
| 00010111 | ... ... ... | ... ... ... | XX shop | ... ... ... |
| 00010112 | ... ... ... | XX shop | ... ... ... | ... ... ... |
| 00010113 | XX shop | ... ... ... | ... ... ... | YY shop |
| 00010114 | ... ... ... | XX shop | ... ... ... | ... ... ... |
| 00010115 | ... ... ... | ... ... ... | XX shop | ... ... ... |
| ... ... ... | ... ... ... | ... ... ... | ... ... ... | ... ... ... |
| 00011111 | ... ... ... | ... ... ... | XX shop | ... ... ... |
| 00011112 | ... ... ... | XX shop | ... ... ... | ... ... ... |
| 00011113 | ... ... ... | XX shop | ... ... ... | ... ... ... |
| 00011114 | ... ... ... | ... ... ... | XX shop | ... ... ... |
| ... ... ... | ... ... ... | ... ... ... | ... ... ... | ... ... ... |
| 00012111 | ... ... ... | ... ... ... | XX shop | ... ... ... |
| 00012112 | ... ... ... | ... ... ... | XX shop | ... ... ... |
| ... ... ... | ... ... ... | ... ... ... | ... ... ... | ... ... ... |
| 00016108 | YY shop | ... ... ... | ... ... ... | XX shop |
| ... ... ... | ... ... ... | ... ... ... | ... ... ... | ... ... ... |

DATA TRANSMISSION SYSTEM FOR PRINTING DATA AT A SITE REMOTE FROM A HOME LOCATION/OFFICE

BACKGROUND OF THE INVENTION (1) Field of the Invention

The present invention relates to a data transmission apparatus (e.g., a print server) for supporting printing of image data on-site or at a site remote from the office. The present invention also relates to an image data communication system in which a data transmission apparatus, a portable terminal device capable of data transmission and reception with the help of a portable telephone, PHS phone or the like, and a printer, are connected to a network.

(2) Description of the Prior Art

The recent development and spread of the internet has made possible exchange of image data etc., via electric mail. As examples of terminal devices, portable terminal devices that can deal with diverse usage environments have been developed. Under such circumstances, the size of the display device provided in such a terminal device is limited to being approximately proportional to the size of the terminal device.

For example, a portable notebook computer may have a relatively large display device and have high enough capacities (of memory and image processing) for displaying image data.

On the contrary, portability-oriented, hand-held information devices such as electronic notebooks etc., use relatively small display devices taking into account their compactness and thinness, and have a simple configuration, and simple capability of processing image information.

Further, with the development in the field of data transmission, not only text data (character data) can be handled as e-mail, but also image documents scanned as electronic data by internet fax, network scanners, or the like can become transmitted as e-mail.

Under these circumstances, there often occur many instances where data needs to be printed on-site. At present, though mobile printing and other technologies are put into practice, it is very difficult for mobile printing to handle data if that data is bulky.

Japanese Patent Application Laid-Open Hei 10 No. 63601 discloses a data printing system for printing data from a site away from the user's office, wherein a print request with printing data is transmitted to the user's office from on-site, and the user is able to immediately obtain printouts with a simple operation when the user returns to the office.

This technology disclosed in the above publication, however, only provides printing at the office, so that it is impossible for the user to obtain the printouts of the data on-site. Further, since the system for the technology disclosed in the above publication needs a dedicated office server, it is not a system which can be openly accessed by any user.

There are businesses that provide printing services from electronic data. However, a person who is a stranger without good knowledge of a certain locale and who does not have information as to the nearby printing service shop that can process their data to be printed will have difficulty in locating such a shop and performing the printing.

SUMMARY OF THE INVENTION

The present invention has been devised in view of the above problems and it is therefore an object of the present invention to provide a data transmission system for facilitating printout of hand-held data on-site.

In order to achieve the above object, the present invention is configured as follows:

In accordance with the first aspect of the present invention, a data transmission system includes: a data terminal device capable of transmitting data via a network; and a plurality of output apparatuses connected on the network for producing the output of the data based on the transmitted data, and is characterized in that one or more output apparatuses capable of producing output of the data based on the transmitted data, is selected based on the data type transmitted from the data terminal device and the positional information of the data terminal device.

In accordance with the second aspect of the present invention, a data transmission system includes: a data terminal device capable of transmitting data via a network; and a plurality of output apparatuses connected on the network for producing printout of the data based on the transmitted data, and is characterized in that one or more output apparatus capable of producing the output of the data based on the transmitted data, is selected based on the functional information of a necessary output apparatus input through the data terminal device and the positional information of the data terminal device.

In accordance with the third aspect of the present invention, a data transmission system includes: a data terminal device capable of transmitting data via a network; a plurality of output apparatuses connected on the network for producing output of the data; a storage portion for storing the information as to installation sites of output apparatuses with their functional information; and an output apparatus candidate selecting portion for extracting one or more candidates for the nearby output apparatus capable of producing the output of the data based on the transmitted data, with reference to the information as to installation sites of output apparatuses with their functional information stored in the storage portion, based on the data type transmitted from the data terminal device and the positional information of the data terminal device.

In accordance with the fourth aspect of the present invention, a data transmission system includes: a data terminal device capable of transmitting data via a network; a plurality of output apparatuses connected on the network for producing the output of the data based on the transmitted data; a storage portion for storing the information as to installation sites of output apparatuses with their functional information; and an output apparatus candidate selecting portion for extracting one or more candidates for the output apparatus capable of producing the output of the data based on the transmitted data, with reference to the information as to installation sites of output apparatuses with their functional information stored in the storage portion, based on the data type transmitted from the data terminal device and the information of the desired area, designated through the data terminal device, where the output of the data is to be produced.

In accordance with the fifth aspect of the present invention, the data transmission system having any one of the above first through fourth aspects is characterized in that the user is allowed to select the output apparatus for producing the output of the data from one or more selected output apparatuses.

In accordance with the sixth aspect of the present invention, the data transmission system having the above fifth aspect is characterized in that the functional information as to one or more selected output apparatuses is given to the user.

In accordance with the seventh aspect of the present invention, the data transmission system having any one of the above second, third or fourth aspects is characterized in that the functional information contains at least one of the information as to the type of the output apparatus to be used, the color information or the printout size information.

In accordance with the eighth aspect of the present invention, the data transmission system having any one of the above first, second or fourth aspects is characterized in that the data type contains the data format or data size.

In accordance with the ninth aspect of the present invention, the data transmission system having the above fifth aspect is characterized in that when the output apparatus has been selected, the data is controlled as output data with ID information added.

In accordance with the tenth aspect of the present invention, the data transmission system having the above ninth aspect is characterized in that the ID information is informed to the data terminal device.

In accordance with the eleventh aspect of the present invention, the data transmission system having the above ninth aspect is characterized in that output of the data is produced when the ID information is input into the output apparatus.

In accordance with the twelfth aspect of the present invention, a data transmission apparatus includes: a portable terminal device capable of transmitting image data via a network; a plurality of output apparatuses connected on the network for producing images based on image data; a storage portion for storing the information as to each installation site of the output apparatuses with their functional information; and an output apparatus candidate selecting portion for extracting the candidates for the nearby output apparatus capable of producing an output of the image data, with reference to the information as to installation sites of the output apparatuses with their functional information stored in the storage portion, based on the image data input via the network from the portable terminal device and the information as to the current position of the portable terminal device, and is characterized in that the image data is transferred to the output apparatus selected by the user from the output apparatus candidates presented by the output apparatus candidate selecting portion.

The thirteenth aspect of the present invention, the data transmission apparatus having the above twelfth aspect is characterized in that the connection with the portable terminal device is made via a cellular phone and the network, and the apparatus is further connected to a cellular phone locating portion which can locate the position of the cellular phone based on the phone number thereof and obtains the positional information of the portable terminal device by referring to the cellular phone locating portion as to the position of the cellular phone.

In accordance with the fourteenth aspect of the present invention, the data transmission apparatus having the above thirteenth aspect is characterized in that each installation site information of the output apparatuses is registered based on the positions of the cellular phone base stations.

In accordance with the fifteenth aspect of the present invention, a data transmission apparatus includes: a portable terminal device capable of transmitting image data via a network; a plurality of output apparatuses connected on the network for producing images based on image data; a storage portion for storing the information as to installation sites of the output apparatuses with their functional information; an output apparatus candidate selecting portion for extracting the candidates for the nearby output apparatus capable of producing an output of the image data, with reference to the information as to installation sites of the output apparatuses with their functional information stored in the storage portion, based on the image data input via the network from the portable terminal device and the information as to the area for printout where the user desires to collect the printout, and is characterized in that the image data is transferred to the output apparatus selected by the user from the output apparatus candidates presented by the output apparatus candidate selecting portion.

In accordance with the sixteenth aspect of the present invention, the data transmission apparatus having any one of the above twelfth through sixteenth aspects is characterized in that the image data input from the portable terminal device via the network can be added with an ID key for confidential printing, and the ID is transferred together with the image data when the image data is given to the output apparatus determined by the user.

In accordance with the seventeenth aspect of the present invention, an image data communication system includes a data transmission apparatus having any one of the above twelfth through sixteenth aspects, a portable terminal device capable of transmitting image data and a plurality of output apparatuses as which the installation site information and functional information have been registered, all being connected on the network.

BRIEF DESCRIPTION OF THE DRAWINGS

FIG. 2 is an illustrative chart of a shop list table stored with information as to the types of output apparatuses;

FIG. 3 is an illustrative view showing the information displayed in a user's portable terminal device;

DESCRIPTION OF THE PREFERRED EMBODIMENTS

One embodiment of the data transmission apparatus and image data communication system according to the present invention will hereinafter be described with reference to the accompanying drawings.

Figure 1:
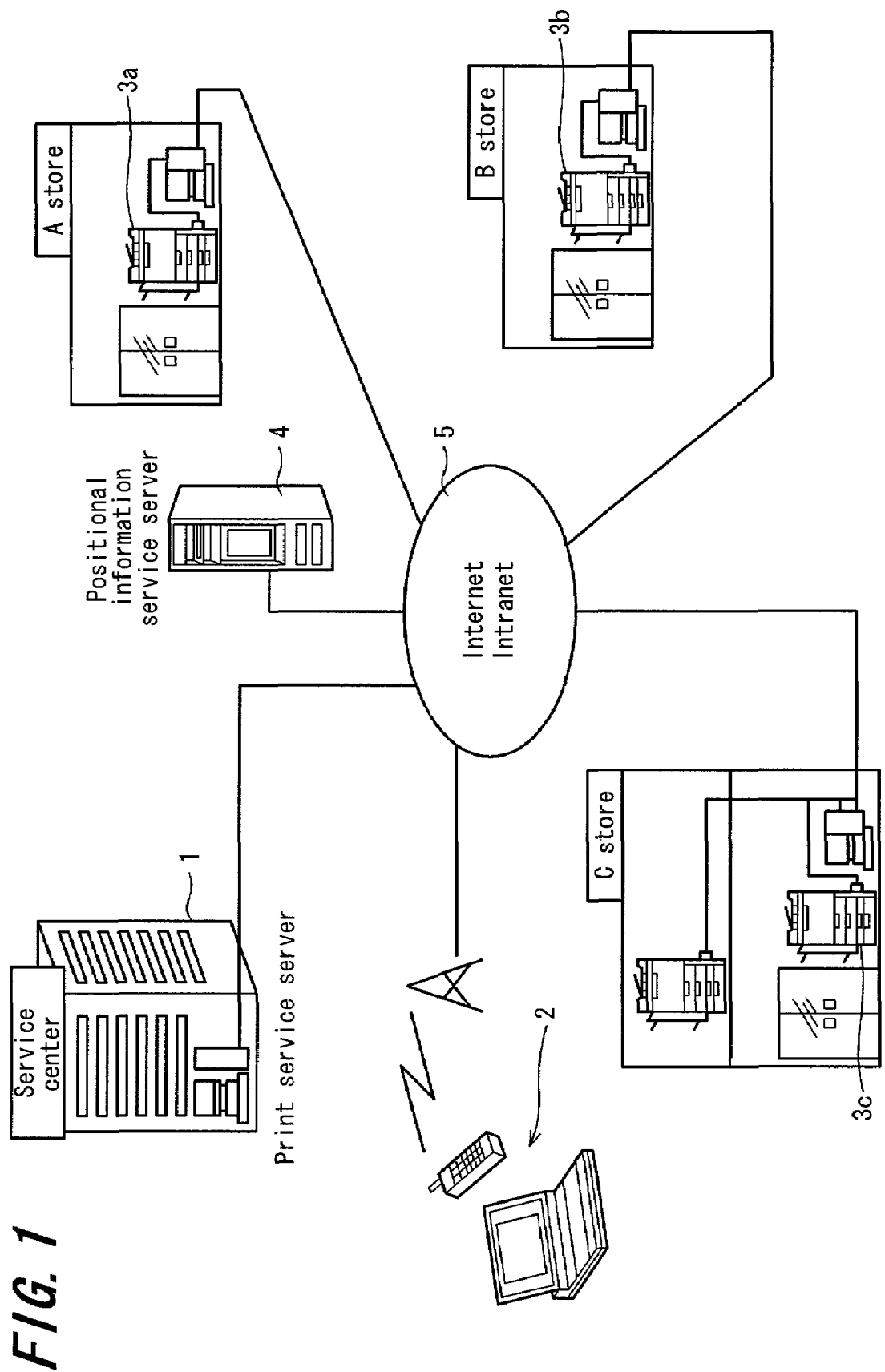
FIG. 1 is an illustrative view showing the schematic configuration of an image data communication system in accordance with an embodiment of the present invention.

FIG. 1 is an illustrative view showing the schematic configuration of an image data communication system in accordance with one embodiment of the present invention.

The image data communication system according to one embodiment of the present invention is a so-called mobile print support system, and includes: as shown in FIG. 1, a print service server (data transmission apparatus) 1 at the service center; a portable terminal device (e.g., hand-held personal computers, compact hand-held terminals such as PHS phone, portable telephone) 2; and output apparatuses 3a to 3c installed at a plurality of shops; a positional information service server 4 for providing a positional information service, all being connected on a network 5 such as the internet, an intranet, or the like.

Here, output apparatus 3 may be a copier having a printer function, for example, and installed at a copy service site in a convenience store etc. In print service server 1, the information as to IP addresses unique to individual output apparatuses 3, the functions of output apparatuses 3 (printer name, printer type color/monochrome, paper size, file format, etc.) and the like is registered beforehand. In FIG. 1, though three shops with output apparatuses 3a to 3c installed therein are shown, many output apparatuses 3 are connected on network 5.

FIG. 2 is an illustrative chart showing a shop list table stored with the information as to output apparatuses 3.

This shop list table functions as a storage portion. As shown in FIG. 2, this shop list table holds information as to a plurality of shop names and relates them to their IP addresses, printer names, printer types, i.e., color/monochrome, paper sizes and file formats.

The aforementioned positional information service server 4 determines the position of the on-site user, based on the position of the base station of the portable telephone or PHS phone. That is, this positional information service server 4 functions as a cellular phone locating devise.

Print service server 1, based on the positional information of a user determined by positional information service server 4 and the printing data (image data) transmitted from the user, determines the nearby shop having a necessary output apparatus 3 capable of producing a printout of the printing data in the form desired by the user, and presents the information to the user via portable terminal device 2.

FIG. 3 is an illustrative view showing the information displayed in a user's portable terminal device 2.

The guidance information provided for the user on their portable terminal device 2 includes, as shown in FIG. 3, the information as to the shops equipped with output apparatuses 3 capable of producing the output of printing data and additional information as to in what form (color, monochrome, compatibility, etc.) the output of the printing data is provided. If the area map around the shop equipped with a necessary output apparatus 3 is displayed along with the above information, this makes it possible for the user to grasp the location of the shop more clearly.

Figures 4A, 4B:
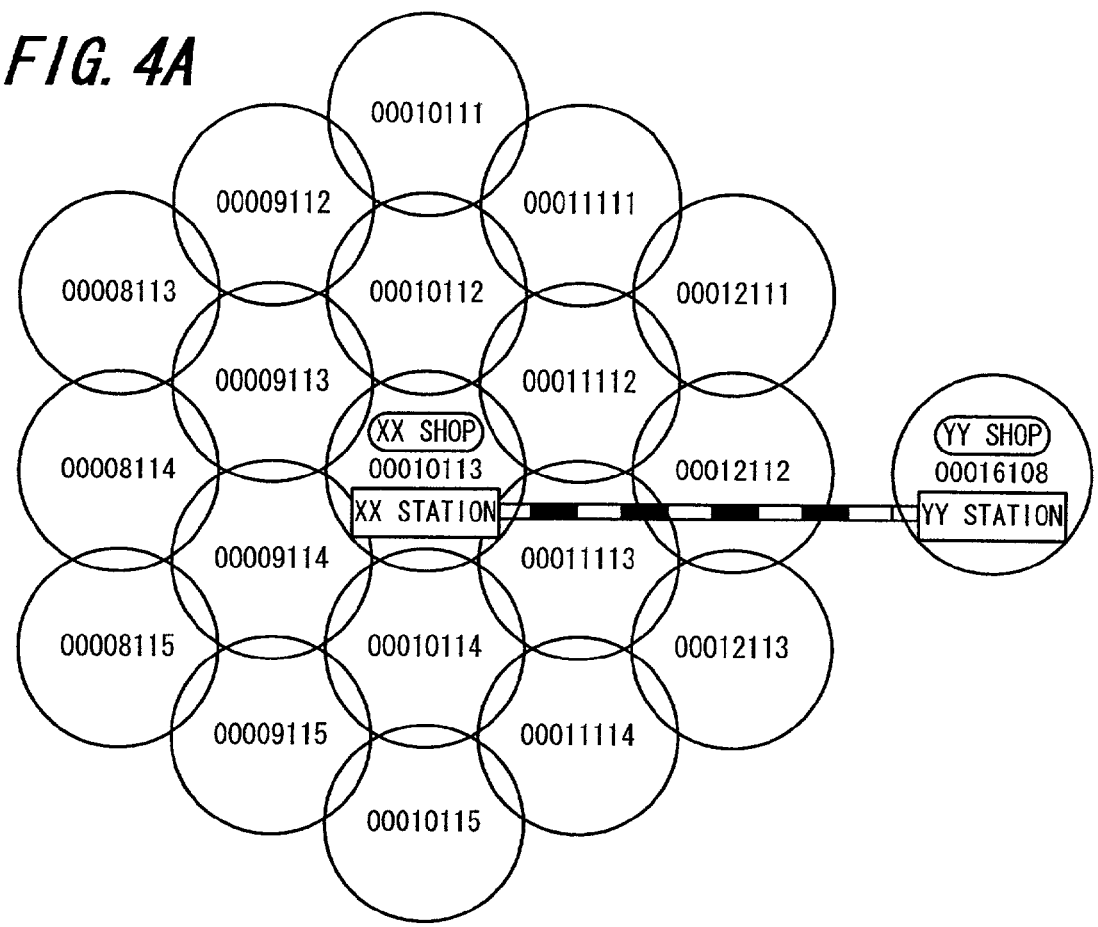
FIG. 4A is an illustrative view showing an example of a regional map in which the region is divided into multiple areas on the basis of cellular phone base stations and FIG. 4B is an illustrative chart of a distance table showing the distances from each area to pre-registered shops equipped with output apparatuses.

Referring next to FIGS. 4A and 4B, description will be made on how the nearby shop equipped with a necessary output apparatus 3 is determined based on the positional information of the portable terminal device 2 of a user.

FIG. 4A is an illustrative view showing a regional map in which the region is divided into multiple areas on the basis of cellular phone (portable telephone and PHS phone) base stations, and FIG. 4B is an illustrative chart of a distance table showing the distances from each area to pre-registered shops equipped with output apparatuses 3.

In print service server 1, the region is divided into a plurality of areas on the basis of cellular phone (portable telephone and PHS phone) base stations, as shown in FIG. 4A. Print service server 1, as shown in FIG. 4B, has a distance table indicating the distances from each area to pre-registered shops equipped with output apparatuses 3. In this distance table, for each area, the shops equipped with output apparatuses 3 are listed from the shortest distance '0' to distance '3', in the order in which they become more distant.

For example, if the current position of a user is determined to be in an area '00010112' by positional information service server 4, print service server 1, based on the distance table (see FIG. 4B), searches for the nearby shop equipped with a necessary output apparatus 3. According to this table, the area '00010112' is located within distance 1 from the XX shop, and the print service server 1 presents the XX shop to the user. When the current position of a user is determined to be in an area '00010113', the area is located distance 3 apart from the YY shop while it is located distance 0 from the XX shop. Therefore, print service server 1 presents the XX shop, which is the nearby, to the user.

Referring next to the flowchart shown in FIG. 5, the sequential procedures on the user and print service server 1 sides in the image data processing system according to this embodiment will be described.

Figure 5:
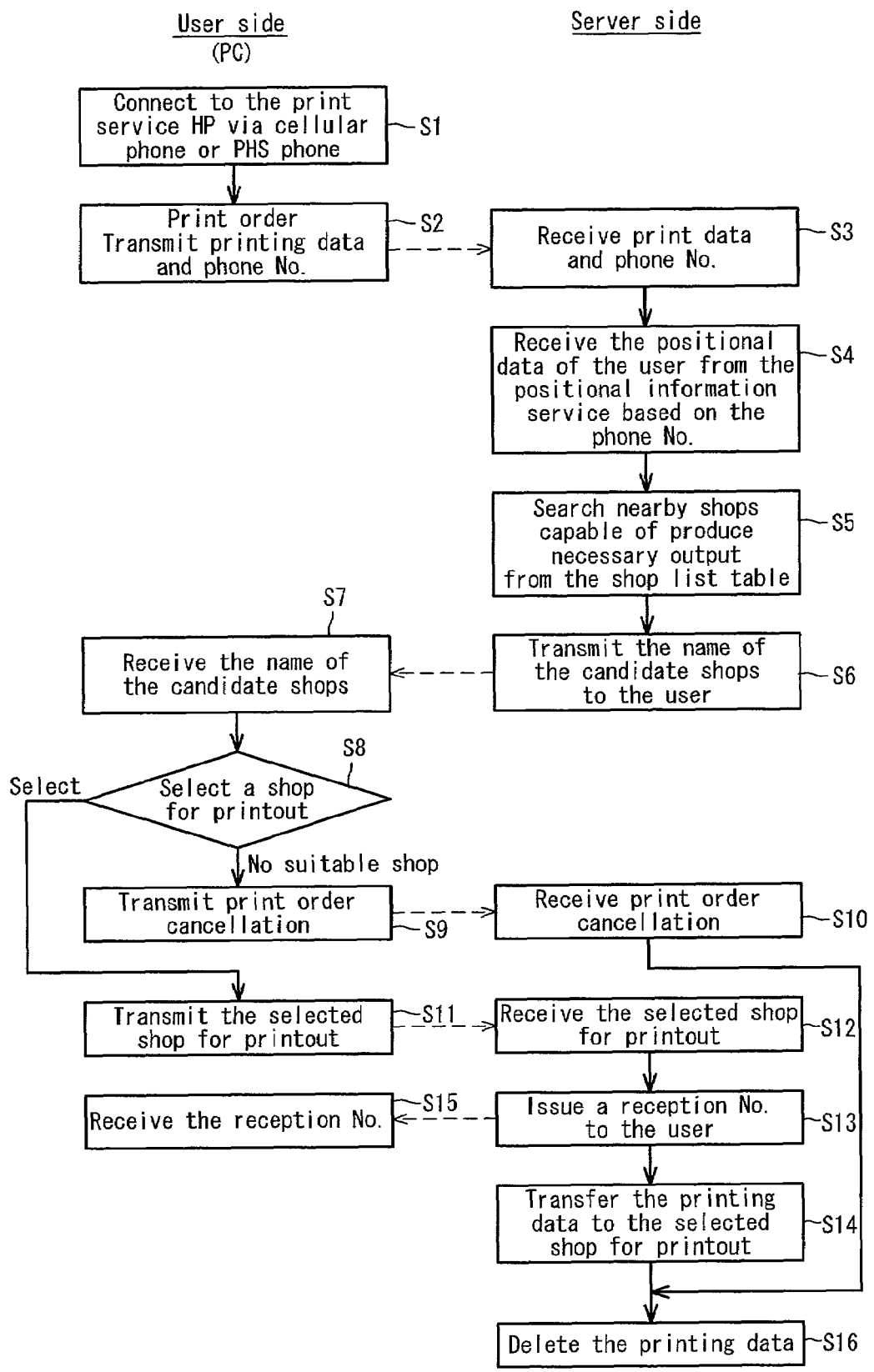
FIG. 5 is a flowchart showing the sequential procedures on the user and print service server sides.

FIG. 5 is a flowchart showing the sequential procedures on the user and print service server 1 sides in the image data processing system according to this embodiment.

In the image processing system of this embodiment, as shown in FIG. 5, the user connects the portable terminal device 2 such as a portable telephone, PHS Phone or the like to the web site (home page (HP)) of the trader providing the print service (S1) and sends the printing data and their phone number to print service server 1 installed at the web site and gives a print command (S2).

The print service server 1, as it receives the printing data and the phone number transmitted from the user (S3), receives the positional information of the user determined based on the user's phone number from positional information service server 4(S4).

Subsequently, print service server 1 refers to the shop list table (see FIG. 2) and based on the positional information of the user, the printing data sent from the user, the type and functions of the output apparatus 3 installed in each shop, the installation sites, etc., searches for the nearby shop equipped with output apparatus 3 capable of handling the user's data (S5). Then, print service server 1 transmits the information proposing the candidate shops to the portable terminal device 2 of the user (S6).

Portable terminal device 2 on the user side receives the information as to the candidate shops from print service server 1(S7) and displays the information on the display device (see FIG. 3) and presents the candidates to the user. Then, the user selects the desired shop, for example nearest shop, from the list of recommended shops (S8). If there is no desirable shop, the user selects the cancellation of the print command and transmits it to print service server 1(S9). When receiving the cancellation of the print command (S10), print service server 1 deletes the received printing data (S16).

When the user has found and selected the desired shop, the designation of the output shop is transmitted to print service server 1(S11). When receiving the designation of output shop (S12), print service server 1 issues a reception number to the user (S13) and at the same time transmits the print data to the user designated shop equipped with a necessary output apparatus 3(S14). The user receives the reception number issued from print service server 1(S15). This reception number works as a confidential ID and is needed when the user actually prints out the data using the output apparatus 3 at the shop designated by the user.

When the above process is completed, print service server 1 deletes the retained printing data (S16).

Though not illustrated, the output apparatus candidate selecting device is composed of a CPU and the like provided for print service server 1 operating in accordance with the predetermined program.

Next, description will be made as to the procedures when the user, after having received the reception number, goes to the shop equipped with the designated output apparatus 3, and collects the printouts of the printing data which the user designated to be printed out.

Figure 6:
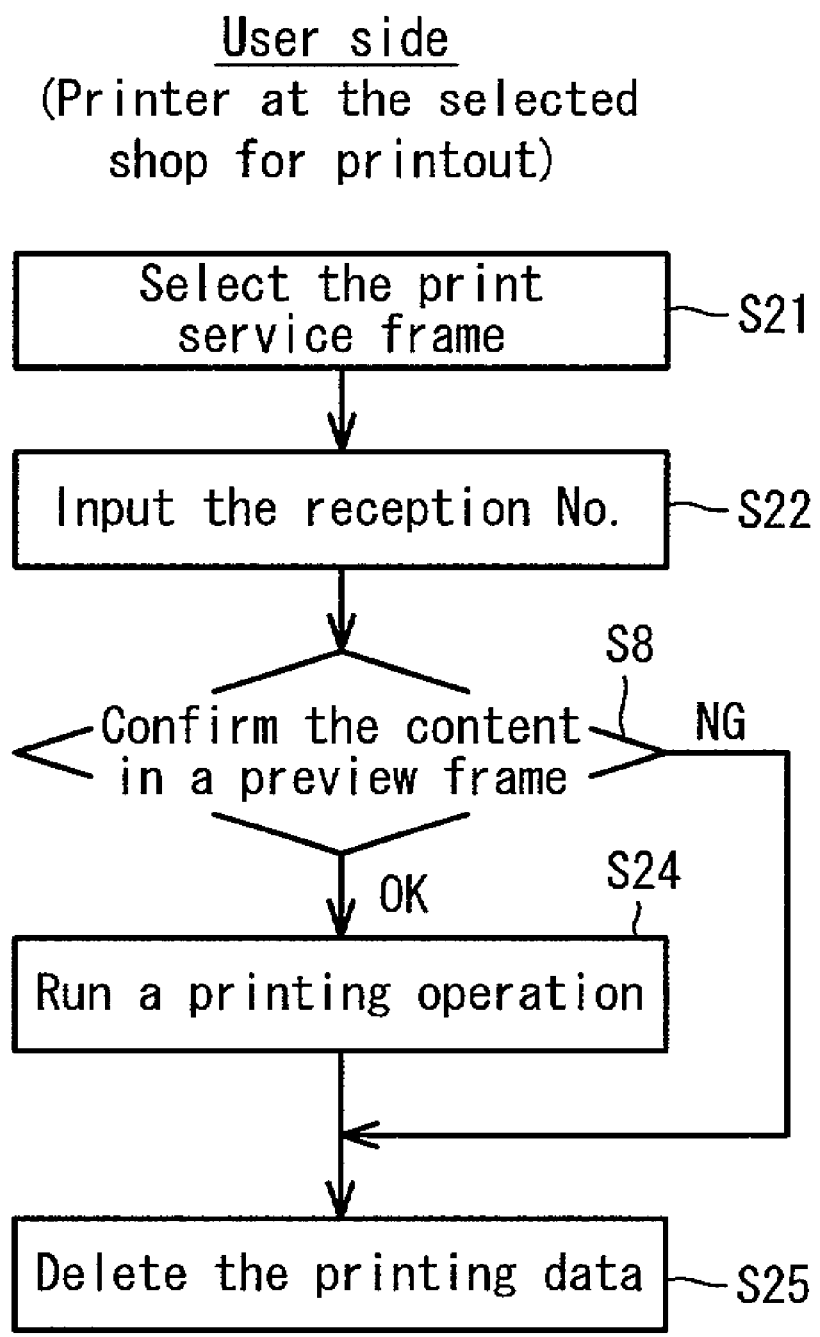
FIG. 6 is a flowchart showing the sequence of the procedures when a user collects their own printouts.

FIG. 6 is a flowchart showing the sequence of the procedures when a user picks up their own printouts.

For the user to obtain the printouts, the user first selects the print service frame in the output apparatus 3 (printer) at the designated shop (S21), and then inputs the reception number issued from print service server 1(S22).

Then, the user checks the content in the preview frame (S23). Here, if no problem with the content is found, printing of the printing data is effected (S24) and then the printing data in the printer is erased on completion of printing (S25).

On the other hand, if any problem with the content in the preview frame was found, the printing data transferred to the printer is erased without execution of the printing operation (S25).

As has been described heretofore, according to the image data communication system of the present invention, an on-site user can obtain from print service server 1 the information as to the nearby shop equipped with a desired output apparatus 3 and hence can easily obtain a printed article of the hand-held data without the necessity of returning to their home site where their own printer is installed.

In the image data communication system according to the present invention, since the position of a user can be determined using their phone number, this configuration enables the user to make use of an output apparatus 3 installed in the nearby shop without the necessity of any special control.

Further, in the image data communication system according to the present invention, print service server 1 sets up a reception number for the received printing data so that this reception number works as the ID key to effect confidential printing. Therefore, the printing data will not be printed out unless the user inputs this reception number at the nearby shop. Therefore, this configuration eliminates the risk of the printout being lost and the risk of the printout being read by others.

In the image data processing system according to the embodiment described above, the current location of a user is determined based on the user's phone number so as to search for information as to the nearby shop equipped with a necessary output apparatus 3 based on the location. However, the user's location may be determined based on other criteria. For example, if the user is travelling by train, the search for the nearby shop equipped with a necessary output apparatus 3 may be made based on the user's arrival point. Thus, the shop equipped with a necessary output apparatus 3 for producing the printout of printing data can be selected by searching for the information as to the nearby shop based on the positional information desired and designated by the user through terminal device 2 so that it is possible to easily obtain the printout of data if the user gives printing instructions for printing data while travelling. Here, the positional information may be an area, point, etc.

When the user inputs necessary functions and additional information for producing a printout of the printing data through terminal device 2, print service server 1, based on the functions of output apparatus 3 and additional information and the positional information of the user, determines the nearby shop, for example nearest shop, equipped with an output apparatus 3 capable of producing a printout of the printing data desired by the user and presents the information to the portable terminal device 2 of the user.

Since the data transmission system, data transmission apparatus and image data transmission system according to the present invention are thus configured as above, the effects and advantages as follows can be obtained.

According to the first and second aspects of the present invention, it is possible to select the nearest output apparatus capable of performing a suitable output based on the transmitted data type or the functional information as to a desired output apparatus input through the data terminal device and the positional information of the data terminal device. Therefore, a user, even when away form their office, is able to easily obtain a printout of hand-held image data using the nearest output apparatus if the user has a data terminal device capable of data transmission.

According to the third aspect of the present invention, since the output apparatuses which meet the feature of the data to be output are listed, it is possible to provide a user-friendly environment which can provide an output in a suitable data form.

According to the fourth aspect of the present invention, since the output apparatuses which reside in the area where the data is output and meet the feature of the data to be output are listed, it is possible to provide a user-friendly environment which can provide an output in a suitable data form.

According to the fifth aspect of the present invention, the user is able to select the desired apparatus from the listed output apparatuses. Therefore, this configuration provides a user-friendly environment.

According to the sixth aspect of the present invention, the user is able to know the listed output apparatuses and select the desired apparatus from the list. Therefore, this configuration provides a user-friendly environment.

According to the seventh and eighth aspects of the present invention, since the output apparatus can be selected depending on the data to be printed out, it is possible to obtain a output of the data in its best form.

According to the ninth aspect of the present invention, it is possible to provide security of the data to be output.

According to the tenth aspect of the present invention, since the ID information is informed to the user, it is possible to improve the confirmation of data output and the operativity of data output.

According to the eleventh aspect of the present invention, it is possible to improve the operativity when the data is output while providing complete security for data communication on the system.

According to the twelfth aspect of the present invention, the installation sites of the output apparatuses and their functions (e.g., color/monochrome, paper size, file format, etc.) are previously stored in the storage portion.

Therefore, based on the positional information of the portable terminal device and the information from this storage portion, the data transmission apparatus is able to extract the candidates for the output apparatus which is capable of outputting the input image data and located nearby. The user then selects the desirable output apparatus, for example nearest output apparatus, from the output apparatuses thus extracted and transmits the choice to the data transmission apparatus, to thereby obtain the printout of the image data using the desired output apparatus.

In this way, a user with a portable terminal device capable of transmitting image data is able to easily obtain printout of hand-held image data, even when away from the their own office, using the nearby output apparatus, for example nearest output apparatus.

According to the thirteenth aspect of the present invention, it is possible to obtain the positional information of a portable terminal device by referring to the cellular phone locating portion (e.g., a positional information service server) for the position of the cellular phone.

Therefore, the data transmission apparatus is able to easily determine the current position of a portable terminal device by referring to the cellular phone locating portion. Therefore, it is no longer necessary for the user to make a special, extra operation to inform the data transmission apparatus of the current position of the user.

In this way, a user even when away from the their own office, is able to easily obtain a printout of hand-held image data using the output apparatus located nearby.

According to the fourteenth aspect of the present invention, each installation site information of the output apparatuses is registered based on the positions of the cellular phone base stations.

Therefore, based on the base station through which communication is being established with the user's cellular phone, it is possible to easily determined the nearby installation site of a necessary output apparatus.

According to the fifteenth aspect of the present invention, the user is able to designate a desired area to collect the printout and select the nearby output apparatus present within the desired area.

Therefore, it is possible for a user who is travelling, for example, to obtain the printout of the hand-held image data using the output apparatus present within the destination area.

According to the sixteenth aspect of the present invention, the image data input from the portable terminal device by way of the network can be added with an ID key for confidential printing.

Accordingly, it is possible to produce the printout of the transferred image data only when the user who has made an output request goes to the selected installation site and inputs the ID key to the output apparatus. Therefore, this configuration eliminates the risk of the printout being lost and the risk of the printout being read by others.

According to the seventeenth aspect of the present invention, it is possible to obtain the above effects produced by the aforementioned data transmission apparatus.

What is claimed is:

1. A data transmission system that supports at least printing of data at a site remote from a home location, comprising:
   a data transmission control apparatus being operably coupled to a network;
   a portable data terminal device being configured and arranged so as to be capable of transmitting data and an output request via the network to the data transmission control apparatus;
   a plurality of output apparatuses being operably connected on the network for producing an output based on the transmitted data;
   wherein in the data transmission apparatus, installation site information of the plurality of output apparatuses and functional information of the plurality of output apparatuses are registered beforehand;
   wherein the data transmission control apparatus determines positional information of the position of the portable data terminal device; and
   wherein the data transmission control apparatus is configured and arranged so as to select one or more output apparatuses of the plurality of output apparatuses, based on the installation site information, based on the functional information, based on a data type of the transmitted data transmitted from the portable data terminal device, and based on the determined positional information of the portable data terminal device.

2. The data transmission system according to claim 1, wherein a user is allowed to select an output apparatus for producing the output of the data from the one or more selected output apparatuses.

3. The data transmission system according to claim 2, wherein the functional information as to the one or more selected output apparatuses is given to the user.

4. The data transmission system according to claim 1, wherein the data type contains at least data format or data size.

5. The data transmission system according to claim 2, wherein when the output apparatus has been selected, the data is controlled as output data with ID information added.

6. The data transmission system according to claim 5, wherein the ID information is informed to the data terminal device.

7. The data transmission system according to claim 5, wherein output of the data is produced when the ID information is input into the output apparatus.

8. The data transmission system according to claim 1, wherein:
   the data transmission control apparatus is further configured and arranged to communicate information relating to the one or more selected output apparatuses to the portable terminal device; and
   the portable terminal device is further configured so as to allow the user to choose a particular one of the one or more selected output apparatuses and to communicate information relating to the chosen output apparatus to the data transmission control apparatus.

9. The data transmission system of claim 8, wherein the data transmission control apparatus communicates the transmitted data to the chosen output apparatus so the transmitted data is outputted there from.

10. The data transmission system of claim 8, wherein:
    functional information for each of the one or more selected output apparatuses is provided to the portable terminal device, the functional information being at least one of the type output apparatus, color information or printout size information; and
    the portable terminal device is further configured so as to provide the functional information for each of the one or more selected output apparatuses to the user.

11. The data transmission system of claim 1, wherein the portable terminal device is further configured and arranged so that a communication device that forms a communication link(s) between the portable terminal device and the network embodies wireless communication techniques.

12. The data transmission system of claim 9, wherein the data transmission control apparatus is further configured and arranged to generate identification information corresponding to an outputting to be performed for the transmitted data communicated to the chosen output apparatus, and to communicate this identification information to the portable terminal device.

13. The data transmission system of claim 12, wherein at least one or more of the plurality of output apparatuses is configured and arranged so an outputting operation is conducted after the user inputs the identification information communicated to the portable terminal device.

14. The data transmission system according to claim 1, wherein the functional information contains at least one of the information as to a type of the output apparatus to be used, colore information or printout size information.

15. A data transmission system that supports at least printing of data at a site remote from a home location, comprising:
   a data transmission control apparatus being operably coupled to a network;
   a portable data terminal device being configured and arranged so as to be capable of transmitting data and an output request via the network to the data transmission control apparatus;
   a plurality of output apparatuses being operably coupled to the network for producing an output based on the transmitted data;
   wherein in the data transmission apparatus, installation site information of the plurality of output apparatuses and functional information of the plurality of output apparatuses are registered beforehand;
   wherein the data transmission control apparatus is configured and arranged so as to extract one or more candidates for the output apparatus from the plurality of outputting apparatuses based on the installation site information, based on the functional information, based on a data type of the transmitted data transmitted from the portable data terminal device, and based on area information of a desired area where the output is to be produced; and
   wherein the area information is inputted from the portable data terminal device.

16. The data transmission system according to claim 15, wherein the functional information contains at least one of the information as to a type of the output apparatus to be used, color information or printout size information.

17. The data transmission system according to claim 15, wherein:
   the data transmission control apparatus is further configured and arranged to communicate information relating to the one or more candidates for the output apparatus to the portable terminal device; and
   the portable terminal device is further configured so as to allow the user to choose a particular one of the one or more candidates selected output apparatuses and to communicate information relating to the chosen output apparatus to the data transmission control apparatus.

18. The data transmission system of claim 17, wherein the data transmission control apparatus communicates the transmitted data to the chosen output apparatus so the transmitted data is outputted there from.

19. The data transmission system of claim 17, wherein:
   functional information for each of the one or more selected candidate output apparatuses is provided to the portable terminal device, the functional information being at least one of the type output apparatus, color information or printout size information; and
   the portable terminal device is further configured so as to provide the functional information for each of the one or more candidate output apparatuses to the user.

20. The data transmission system of claim 18, wherein the data transmission control apparatus is further configured and arranged to generate identification information corresponding to an outputting to be performed for the transmitted data communicated to the chosen output apparatus, and to communicate this identification information to the portable terminal device.

21. The data transmission system of claim 20, wherein at least one or more of the plurality of output apparatuses is configured and arranged so an outputting operation is conducted after the user inputs the identification information communicated to the portable terminal device.

22. The data transmission system according to claim 15, wherein a user is allowed to select an output apparatus for producing the output of the data from the one or more selected output apparatuses.

23. The data transmission system according to claim 22, wherein the functional information as to the one or more selected output apparatuses is given to the user.

24. The data transmission system according to claim 22, wherein when the output apparatus has been selected, the data is controlled as output data with ID information added.

25. The data transmission system according to claim 24, wherein the ID information is informed to the data terminal device.

26. The data transmission system according to claim 24, wherein output of the data is produced when the ID information is input into the output apparatus.

27. The data transmission system according to claim 15, wherein the data type contains at least data format or data size.

28. The data transmission system of claim 15, wherein the portable terminal device is further configured and arranged so that a communication device that forms a communication link(s) between the portable terminal device and the network embodies wireless communication techniques.

* * * * *